Jan. 22, 1963   W. R. BUECHLER   3,074,134
FASTENING MEANS
Filed April 14, 1961   2 Sheets-Sheet 1
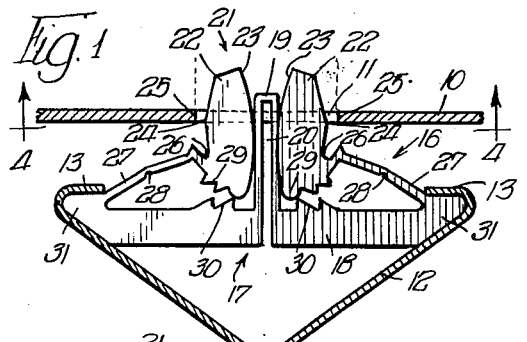
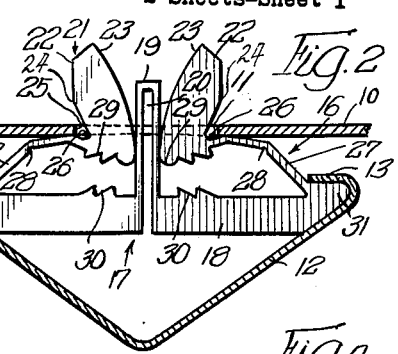
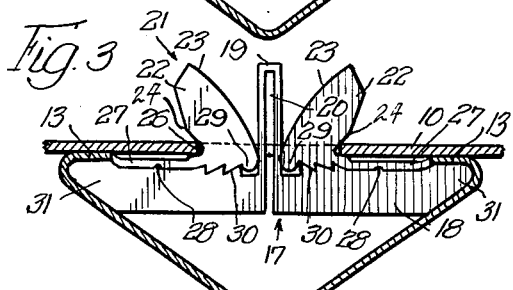
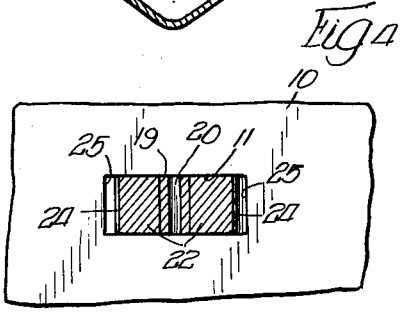
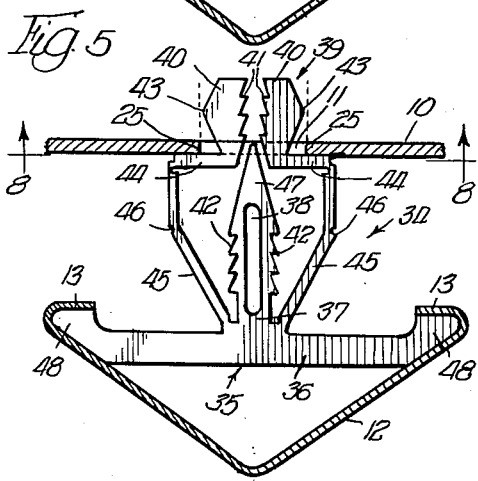
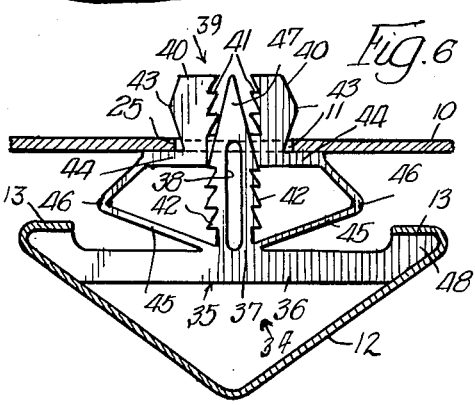
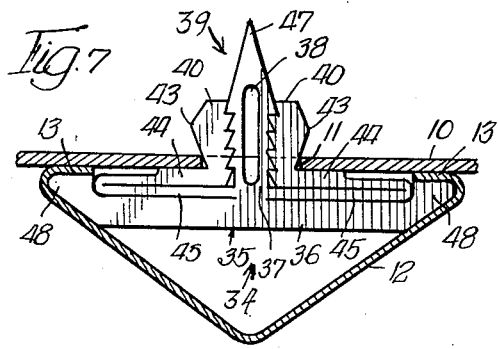
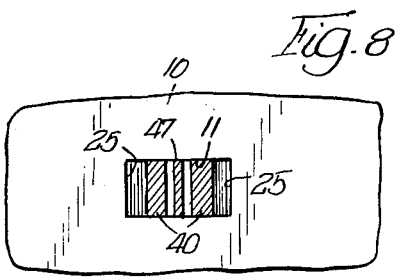
INVENTOR.
William R. Buechler,
BY
Robert R. Lockwood
Atty Jan. 22, 1963 W. R. BUECHLER 3,074,134
FASTENING MEANS
Filed April 14, 1961 2 Sheets-Sheet 2
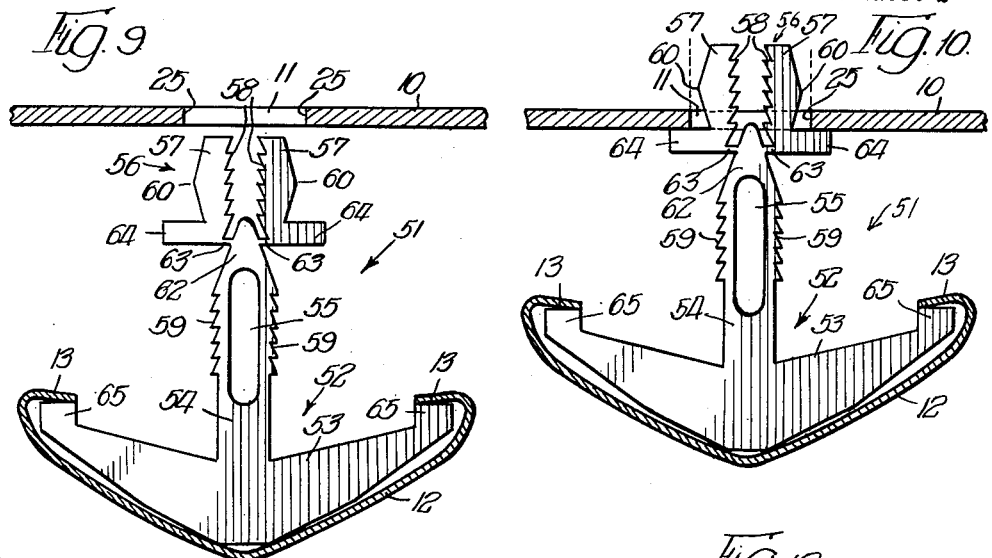
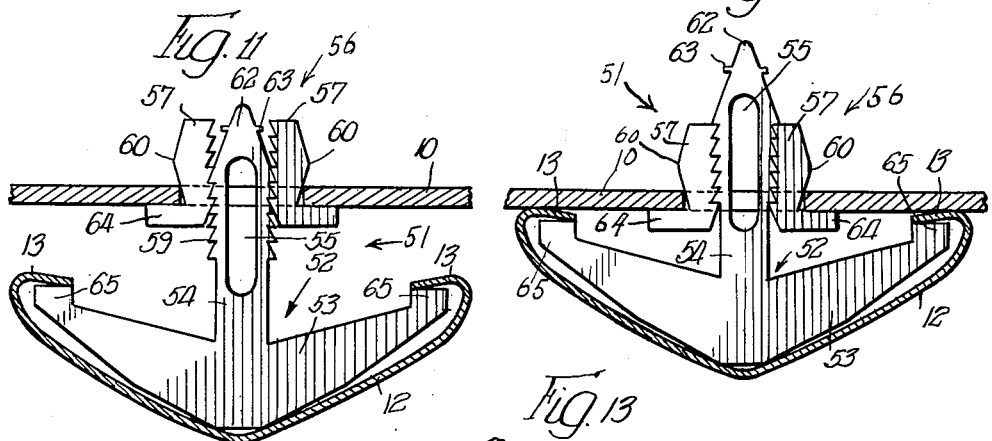
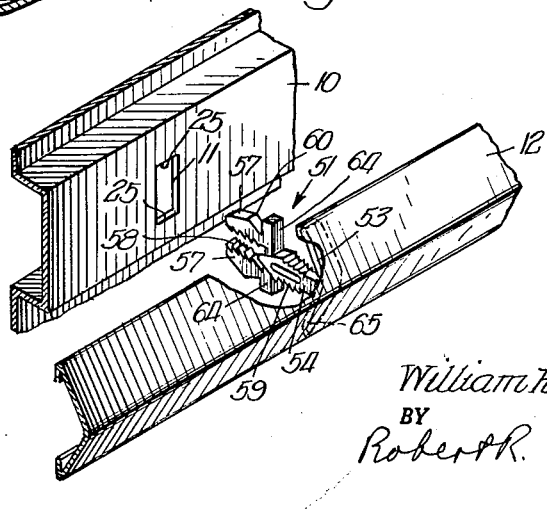
INVENTOR.
William R. Buechler,
BY
Robert R. Lockwood
Atty United States Patent Office 3,074,134
Patented Jan. 22, 1963

3,074,134
FASTENING MEANS
William R. Buechler, Birmingham, Mich., assignor to Thompson Industries, Inc., Indianapolis, Ind., a corporation of Massachusetts
Filed Apr. 14, 1961, Ser. No. 103,124
8 Claims. (Cl. 24—73)

This invention relates, generally, to a fastening means and it has particular relation to means for securing a moulding to a support, such as the chrome trim to the wall of an automobile body.

Among the objects of this invention are: To provide for holding a member to an apertured support in a new and improved manner; to provide a retainer for this purpose cut from an extruded member of plastic, such as nylon, vinyl resin or the like, to minimize scratching of the painted support and of the edges of the apertures or holes to prevent rust bleeding; to fashion the retainer in such manner that it is collapsible on application to the aperture in the support and is self locking; to provide a head on the retainer capable of interfitting with a moulding to hold it in position on the support when the retainer is inserted in the aperture and a part of it is expanded to hold it in place, the head having sufficient resiliency to accommodate variations in the moulding; to provide a one piece retainer having a T-shaped body portion connected to an expansible two part nose portion arranged to be expanded after insertion in the aperture from one side of the support so as to overlie the other side of the support with the stem of the T-shaped body portion between the two parts of the nose portion with the degree or extent to overlie the take up variations in the thickness of the support; to flexibly interconnect the two parts of the nose portion with the T-shaped body portion; to provide serrations on the T-shaped body portion and on the two parts of the nose portion for locking the retainer in operative position on the support; to construct the stem of the T-shaped body portion in such manner that the sides thereof can flex inwardly so as to facilitate the entry of the stem between the two parts of the nose portion and interlocking of the same and to take up variations in the hole or aperture; and to provide rupturable ribs between the tip of the stem and the two parts of the nose portion, the ribs being broken as an incident to the application of the retainer to the support.

In the drawings:

FIG. 1 is a view at an enlarged scale, partly in section and partly in side elevation, showing how one embodiment of a retainer constructed in accordance with this invention is applied to a generally U-shaped moulding with the retainer having its nose portion entering a rectangular aperture in the support to which the moulding is to be secured.

FIG. 2 is a view, similar to FIG. 1, and showing an intermediate step in the application of the retainer to the support.

FIG. 3 is a view, similar to FIGS. 1 and 2, showing the retainer in the fully inserted position and locked in place.

FIG. 4 is a sectional view taken generally along the line 4—4 of FIG. 1.

FIG. 5 is a view, similar to FIG. 1, showing another embodiment of the retainer constructed in accordance with this invention, the nose portion being flexibly connected to the T-shaped body portion at the juncture between the stem and the head.

FIG. 6 is a view, similar to FIG. 5, and showing an intermediate stage in the application of the retainer to the support.

FIG. 7 is a view, similar to FIGS. 5 and 6, showing the retainer in the final locked position where it holds the moulding in position on the support.

FIG. 8 is a sectional view taken generally along the line 8—8 of FIG. 5.

FIG. 9 is a view, similar to FIGS. 1 and 5, and shows another embodiment of the invention in which the expandable nose portion is attached to the tip of the stem of the T-shaped body portion of the retainer by rupturable ribs.

FIGS. 10 and 11 are views, similar to FIG. 9, and showing intermediate steps in the application of the retainer to the support.

FIG. 12 is a view, similar to FIGS. 9, 10 and 11, showing the retainer in the final position where it securely holds the moulding in place on the support.

FIG. 13 is a perspective view showing a typical application of the embodiment of the invention illustrated in FIGS. 9–12 to a typical support provided with a rectangular aperture for receiving the retainer.

Referring now particularly to FIG. 1 of the drawings, it will be observed that the reference character 10 designates a support which may be formed of sheet steel and have a thickness of the order of 1/16". It will be understood that the support 10 may comprise a part of the sheath of an automobile body or an automobile door although it is not so limited since the support 10 may form a part of other devices as may be desired. The support 10 is provided with a rectangular aperture 11 for receiving a retainer to be described which is employed for holding a moulding 12, having a generally U-shaped cross section, in position on the support 10. As is conventional the moulding 12 is provided with inturned flanges 13—13 along the sides.

There is indicated, generally, at 16 one embodiment of a retainer that can be employed for holding the moulding 12 in operative position on the support 10. The moulding 16 is formed by extruding a section of indefinite length of plastic material such as nylon, vinyl resin or the like, through a suitable die, the extrusion having the cross section as illustrated in FIG. 1. The extrusion then is cut transversely to provide the retainer 16. The thickness of the retainer 16 depends upon the holding force that is required. The greater the thickness of the retainer 16 the greater will be the force that it is capable of exerting to hold the moulding 12 in place. On the other hand, the greater the thickness the greater the cost. Accordingly, the thickness of the retainer 16 is chosen with a consideration being given to both the force that it is required to exert and the cost necessary to provide an economical construction. Thus variations for the cost/strength ratio can be obtained without retooling since no change is required in the shape of the extrusion die.

It will be observed that the retainer 16 includes a one piece configuration that is formed, in part, by a T-shaped body portion 17 having a head 18 and a stem 19. The stem 19 has an elongated central opening 20 to permit the sides of the stem to collapse toward each other when the retainer 16 is applied to the support 10 and locked in position thereon as will be described hereinafter.

The retainer 16 also includes a nose portion that is indicated, generally, at 21 which is expansible and comprises two parts 22—22 which are cam shaped and have arcuate surfaces 23—23 juxtaposed to opposite sides of the stem 19. The other sides of the parts 22—22 have tips 24—24 that are spaced apart a distance somewhat less than the distance between the ends 25—25 of the rectangular aperture 11 projections of which are indicated by the broken lines. These clearance spaces are provided in order to facilitate entry of the nose portion 21 into the rectangular aperture 11 in the support 10. The outer sides of the parts 22—22 of the nose portion 21 are provided with reentrant sections 26—26 for engaging the ends 25—25 of the rectangular aperture 11 as the nose portion 21 is pushed through it to cause the parts 22—22 to rock into overlying position with the opposite side of the support 10. The parts 22—22 of the nose portion 21 have flexible connections 27—27 extending therefrom to the ends of the head 18. The connections 27—27 are arranged to flex at 28—28 intermediate their ends as well as to flex at the ends thereof where they are joined, respectively, to the ends of the head 18 and the parts 22—22 of the nose portion 21.

In order to lock the parts 22—22 in the operated position serrations 29—29 are provided at the inner ends thereof for interfitting with serrations 30—30 on the under side of the head 18 of the T-shaped body portion 17. The ends 31 of the head 18 are shaped so as to conform to the inturned flanges 13—13 of the moulding 12 and those portions of the moulding 12 adjacent thereto.

When the moulding 12 is to be applied to the support 10, a number of the retainers 16 are inserted from one end into the moulding 12 depending upon the number of apertures 11. It will be understood that this number will vary depending upon the length of the moulding 12 and the holding force required. For illustrative purposes, only a single aperture 11 and a single retainer 16 are shown. The moulding 12 with the retainer 16 positioned therein, as shown in FIG. 1, is moved relative to the support 10 and the nose portion 21 is inserted through the rectangular aperture 11. Then the moulding 12 is moved toward the juxtaposed side of the support 10, as shown in FIG. 2, to bring the reentrant sections 26—26 adjacent the ends 25—25 of the aperture 11. The continued application of force in the direction of the support 10 and lengthwise of the stem 19 causes the parts 22—22 to rock with the result that the tips 24—24 move away from each other and the parts 22—22 overlie the opposite side of the support 10. This rocking movement of the parts 22—22 is permitted because of the provision of the flexible connections 27—27 and also since the sides of the stem 19 can flex inwardly because of the provision of the elongated central opening 20. In the final position, shown in FIG. 3, the serrations 30—30 on the under side of the head 18 interfit with the serrations 29—29 at the inner ends of the parts 22—22 while the flexible connections 27—27 are folded at the flexing positions 28—28 so that the ends thereof overlie each other with the result that the retainer 16 is securely locked in position and cannot be dislodged without rupturing it in some fashion.

FIGS. 5–8 show another embodiment of the invention. Here it will be observed that a retainer, shown generally at 34, is arranged for securing the moulding 12 in position on the support 10 when a portion of it is inserted through the rectangular aperture 11 therein. As described hereinbefore, the retainer 34 is formed by cutting off the desired thickness from a length of extruded plastic having a cross section initially as shown in FIG. 5. The retainer 34 includes a T-shaped body portion, shown generally at 35, having a head 36 and a central laterally extending stem 37 which is provided with a central opening 38 to permit the sides of the stem 37 to collapse slightly when the stem 37 is inserted in the final locking position. The retainer 34 also includes a nose portion, shown generally at 39, which is expansible and which is formed by parts 40—40. The inner sides of the parts 40—40 are provided with serrations 41—41 for interfitting with serrations 42—42 that are formed on the opposite sides of the stem 37.

The parts 40—40 of the nose portion 39 have tips 43—43 at the junction between oppositely inclined outer surfaces, the distance apart of these tips 43—43 being less than the distance between the ends 25—25 of the rectangular aperture 11 sufficient to provide ample clearance and permit ready insertion of the nose portion 39 to the position shown in FIG. 5. Extending laterally from the inner ends of the parts 40—40 are arms 44—44 having flexible connections 45—45 at the ends the other ends of which are flexibly joined to the underside of the head 36 at the juncture between it and the stem 37. The flexible connections 45—45 are extruded in such manner that they tend to flex at 46—46 intermediate the ends in order to facilitate collapsing of the retainer 34 when it is applied. The tip 47 of the stem 37 is wedge shaped to facilitate entry between the parts 40—40 of the nose portion 39 and to force them apart and into engagement with the ends 25—25 of the rectangular aperture 11. The ends 48—48 of the head 36 are shaped so as to conform to the inturned flanges 13—13 along the sides of the moulding 12 and to the portions thereof where they are contiguous thereto.

The retainer 34 is inserted into the moulding 12 from one end and slid to the desired position. Then it and the moulding 12 are moved toward the support 10 and the nose portion 39 inserted through the rectangular aperture 11, as shown in FIG. 5, until the arms 44—44 engage one side of the support 10. Continued force is applied to the moulding 12 and thereby to the head 36 in the direction of the support 10 and endwise of the stem 37. As a result, as shown in FIG. 6, the connections 45—45 are flexed at 46—46 and the tip 47 moves the parts 40—40 laterally so that they overlie the opposite side of the support 10. FIG. 7 shows the final position of the retainer 34 where it is completely collapsed and the parts 40—40 engage the juxtaposed ends 25—25 of the rectangular aperture 11 while the serrations 42—42 on the stem 37 interfit with the serrations 41—41 on the juxtaposed sides of the parts 40—40. Thus the assembly is securely held in position on the support 10 with the parts 40—40 wedged outwardly so as to provide side pressure against the ends 25—25 of the rectangular aperture 11. The assembly is such that the retainer 34 cannot be removed without rupturing it. As a result, the moulding 12 is securely held in position on the support 10.

FIGS. 9–13 show another embodiment of the invention which is different from that shown in FIGS. 5–10 in that the flexible connections 45—45 there shown are not employed. In the embodiment of the invention shown in FIGS. 9–13 a retainer, shown generally at 51, is employed which is cut from an extruded length of plastic material. It includes a T-shaped body portion, illustrated generally at 52, having a head 53 and laterally extending stem 54 which is provided with an elongated central opening 55. The retainer 51 includes an expansible nose portion, shown generally at 56, which is formed of parts 57—57 that are arranged to be moved away from each other after they have been inserted through the rectangular aperture 11 in the support 10. The parts 57—57 are provided with serrations 58—58 that are arranged to interfit with serrations 59—59 on the opposite sides of the stem 54. The outer sides of the parts 57—57 are inclined in opposite directions from tips 60—60 the distance between which is substantially less than the distance between the ends 25—25 of the rectangular aperture 11 in order to provide ample clearance and permit insertion of the nose portion 56. The stem 54 has a tip 62 that is wedge shaped for the purpose of moving the parts 57—57 of the nose portion 56 apart.

In this embodiment of the invention the nose portion 56 is initially formed in one piece with the T-shaped body portion 52 by rupturable ribs 63—63 which extend laterally from opposite sides of the inclined surfaces of the tip 62 and arms 64 which extend laterally from the inner ends of the parts 57—57 and serve to limit the extent that the nose portion 56 can be inserted through the rectangular aperture 11. The ribs 63—63 are relatively small in cross section and can be ruptured readily on application of force endwise of the stem 54 incident to the application of the retainer 51.

It will be understood that the head 53 of the T-shaped body portion 52 has its ends 65—65 arranged for insertion underneath the inturned flanges 13—13. The shape of the head 53 with its ends 65—65 is related to the internal configuration of the moulding 12 an inturned flanges 13—13 to provide a relatively snug sliding fit therebetween.

As before, the retainer 51 is applied to the moulding 12 by inserting the head 53 from one end and sliding it therealong to the desired position. Then, as shown in FIG. 10, the assembly is moved toward the support 10 and the nose portion 56 inserted in the rectangular aperture 11 with the arms 64—64 engaging one side of the support 10. The preliminary steps for applying the assembly to the support 10 are illustrated also in FIG. 13. Now sufficient force is applied to the moulding 12 in the direction of the support 10 and along the stem 54 to rupture the ribs 63—63 and to move the stem 54, as shown in FIG. 11, through the central portion of the rectangular aperture 11 where it spreads the parts 57—57 of the nose portion 56 apart and moves them into sidewise pressure engagement with the ends 25—25 of the rectangular aperture 11. The serrations 59—59 ratchet past the serrations 58—58 on the parts 57—57. This action is facilitated because of the provision of the elongated central opening 55 which allows the sides of the stem 54 to move toward each other through the required extent to permit this action. FIG. 12 shows the retainer 51 in completely collapsed and locked position where it securely holds the moulding 12 in place on the support 10.

Since certain further changes can be made in the foregoing construction and different embodiments of the invention can be made without departing from the spirit and scope thereof, it is intended that all matters shown in the accompanying drawings and described hereinbefore shall be interpreted as illustrative and not in a limiting sense.

What is claimed as new is:

1. As an article of manufacture a retainer for mounting on an apertured support comprising a collapsible one piece body portion having a head and a stem provided with an elongated central opening defined by flexible sides for insertion in the aperture in said support from one side and an attached relatively movable two part nose portion also insertable from said one side of said support in said aperture on opposite sides of said stem to overlie the opposite side of said support, and locking means on said body portion and said nose portion in the form of teeth on each part of said nose portion and corresponding teeth on said body portion arranged to interfit and prevent separation thereof when said stem and said nose portion are inserted in said aperture and said two parts of said nose portion are moved apart to overlie said other side of said support as a result of the application of force to said head toward said support and endwise of said stem.

2. As an article of manufacture a retainer for mounting on an apertured support a moulding or the like having a generally U-shaped cross section with inturned flanges along the edges, said retainer comprising a collapsible one piece T-shaped body portion and an attached relatively movable expansible nose portion, the head of said T-shaped body portion being adapted to interfit in said moulding with the ends of said head underlying and held by said internal flanges and the stem of said T-shaped body portion being provided with an elongated central opening defined by flexible sides for insertion in the aperture in said support from one side, said nose portion being in two parts and insertable from said one side of said support in said aperture on opposite sides of said stem to overlie the opposite side of said support, and locking means on said body portion and said nose portion in the form of teeth on each part of said nose portion and corresponding teeth on said body portion arranged to interfit and prevent separation thereof when said stem and said nose portion are inserted in said aperture and said two parts of said nose portion are moved apart to overlie said other side of said support as a result of the application of force to said head toward said support and endwise of said stem.

3. As an article of manufacture a retainer for mounting on an apertured support comprising a collapsible one piece body portion and a relatively movable nose portion, said body portion being of T-shape with the stem having an elongated central opening defined by flexible sides for insertion in the aperture in said support from one side, said nose portion being formed in two parts for insertion in said aperture on opposite sides of said stem to overlie the opposite side of said support, and locking means on opposite sides of said stem and on said parts of said nose portion arranged to interfit and prevent separation thereof when said stem and nose portion are inserted in said aperture and said two parts of said nose portion are moved apart to overlie said other side of said support as a result of the application of force to said head toward said support endwise of said stem, said locking means being in the form of serrations in locked position extending toward said other side of said support, said stem having a tip at the end away from said head of wedge shape to facilitate entry between said parts of said nose portion and to spread them apart.

4. As an article of manufacture a retainer for mounting on an apertured support comprising a collapsible one piece body portion and a relatively movable nose portion, said body portion being of T-shape with the stem having an elongated central opening defined by flexible sides for insertion in the aperture in said support from one side, said nose portion being formed in two parts for insertion in said aperture on opposite sides of said stem to overlie the opposite side of said support, a flexible connection between each part of said nose portion and the respective side of said stem at its juncture with the head of said T-shape, and serrations on said opposite sides of said stem interfitting with serrations on the inner sides of said parts of said nose portion preventing separation thereof when said stem and nose portion are inserted in said aperture and said two parts of said nose portion are moved apart to overlie said other side of said support as a result of the application of force to said head toward said support endwise of said stem.

5. As an article of manufacture a retainer for mounting on an apertured support comprising a collapsible one piece body portion and a relatively movable nose portion, said body portion being of T-shape with the stem having an elongated central opening defined by flexible sides for insertion in the aperture in said support from one side, said nose portion being formed in two parts for insertion in said aperture on opposite sides of said stem to overlie the opposite side of said support, rupturable ribs interconnecting opposite sides of the tip of said stem and the respective part of said nose portion, and serrations on opposite sides of said stem interfitting with serrations on the inner sides of said parts of said nose portion preventing separation thereof when said stem and said nose portion are inserted in said aperture, said ribs are ruptured and said two parts of said nose portion are moved apart to overlie said other side of said support as a result of the application of force to said head toward said support endwise of said stem.

6. As an article of manufacture a retainer for mounting on an apertured support comprising a collapsible one piece body portion and a relatively movable nose portion, said body portion being of T-shape with the stem having an elongated central opening defined by flexible sides for insertion in the aperture in said support from one side, said nose portion being formed in two parts for insertion in said aperture on opposite sides of said stem to overlie the opposite side of said support, rupturable ribs interconnecting opposite sides of the tip of said stem and the respective part of said nose portion, and serrations on opposite sides of said stem interfitting with serrations on the inner sides of said parts of said nose portion preventing separation thereof when said stem and said nose-portion are inserted in said aperture, said ribs are ruptured and said two parts of said nose portion are moved apart to overlie said other side of said support as a result of the application of force to said head toward said support endwise of said stem, said tip being wedge shaped to facilitate entry between said parts of said nose portion and to spread the same apart, said rupturable ribs extending laterally from the inclined sides of said tip intermediate the length thereof.

7. As an article of manufacture a retainer for mounting on an apertured support comprising a collapsible one piece body portion and a relatively movable nose portion, said body portion being of T-shape, said nose portion being formed in two parts for insertion in said aperture on opposite sides of said stem to overlie the opposite side of said support, rupturable ribs interconnecting opposite sides of the tip of said stem and the respective part of said nose portion and serrations on the inner sides of said parts of said nose portion cooperating with said stem to prevent separation thereof when said stem and said nose portion are inserted in said aperture, said ribs are ruptured and said two parts of said nose portion are moved apart to overlie said other side of said support as a result of the application of force to said head toward said support endwise of said stem.

8. As an article of manufacture a retainer for mounting on an apertured support comprising a collapsible one piece body portion and a relatively movable nose portion, said body portion being of T-shape, said nose portion being formed in two parts for insertion in said aperture on opposite sides of said stem to overlie the opposite side of said support, rupturable ribs interconnecting opposite sides of the tip of said stem and the respective part of said nose portion, and serrations on the inner sides of said parts of said nose portion cooperating with said stem to prevent separation thereof when said stem and said nose portion are inserted in said aperture, said ribs are ruptured and said two parts of said nose portion are moved apart to overlie said other side of said support as a result of the application of force to said head toward said support endwise of said stem, said tip being wedge shaped to facilitate entry between said parts of said nose portion and to spread the same apart, said rupturable ribs extending laterally from the inclined sides of said tip intermediate the length thereof.

References Cited in the file of this patent

UNITED STATES PATENTS

| | | |
|---|---|---|
| 2,748,645 | Peckham et al. | June 5, 1956 |
| 2,788,047 | Rapata | Apr. 9, 1957 |
| 2,908,955 | Brown | Oct. 20, 1959 |
| 2,937,834 | Orenick et al. | May 24, 1960 |
| 2,956,468 | Macy | Oct. 18, 1960 |